(12) United States Patent
Horner

(10) Patent No.: US 11,225,797 B2
(45) Date of Patent: Jan. 18, 2022

(54) ROLLER FOR APPLYING A SHEET OR MEMBRANE TO A GENERALLY VERTICAL SURFACE

(71) Applicant: Everhard Products, Inc., Canton, OH (US)

(72) Inventor: Andrew J. Horner, Canton, OH (US)

(73) Assignee: Everhard Products, Inc., Canton, OH (US)

( * ) Notice: Subject to any disclaimer, the term of this patent is extended or adjusted under 35 U.S.C. 154(b) by 216 days.

(21) Appl. No.: 16/430,637

(22) Filed: Jun. 4, 2019

(65) Prior Publication Data

US 2019/0368200 A1  Dec. 5, 2019

Related U.S. Application Data

(60) Provisional application No. 62/680,127, filed on Jun. 4, 2018.

(51) Int. Cl.
*E04D 15/06* (2006.01)
*B29C 65/48* (2006.01)
(Continued)

(52) U.S. Cl.
CPC .............. *E04D 15/06* (2013.01); *B29C 65/48* (2013.01); *B29C 66/47* (2013.01); *B29C 63/02* (2013.01);
(Continued)

(58) Field of Classification Search
CPC ......... E40D 15/04; E40D 15/06; E40D 5/148; B05C 17/023; B29C 65/48; B29C 65/483; B29C 65/78; B29C 65/80; B29C 63/02; B29C 63/024; B29C 66/47; B29C 66/472; B29C 66/4722; B29C 66/43; B29C 66/73185; B29C 66/71; B29C 66/7392; B29C 66/8122; B29C 66/1122; B29C 66/5326; B29C 66/8362; B29C 66/861; B29C 66/81469; B29L 2031/108; B29L 2031/283; B29L 2031/324; B29L 2031/328; B29K 2021/00; B29K 2883/00
(Continued)

(56) References Cited

U.S. PATENT DOCUMENTS 2,805,439 A * 9/1957 Parker ................. B05C 17/0227
15/230.11
2,982,981 A * 5/1961 Waara ..................... A47L 11/40
15/114

(Continued)

FOREIGN PATENT DOCUMENTS

DE  2928300  2/1981
WO  2017/183023  10/2017

*Primary Examiner* — Philip C Tucker
*Assistant Examiner* — Brian R Slawski
(74) *Attorney, Agent, or Firm* — Sand, Sebolt & Wernow Co., LPA

(57) ABSTRACT

A hand tool has a plurality of similarly or identically shaped rollers aligned end-to-end along an axle such that the outer surface of each respective roller moves about an axis define by the axle. The hand tool may be a roofing roller tool that enables an impermeable vapor membrane or sheet to be applied to a vertical wall extending upwardly from an outer perimeter of a roof. The tool may be manipulated by an elongated pole handle coupled to a roller head or roller head frame.

14 Claims, 4 Drawing Sheets

(51) Int. Cl.
  *B29C 65/00* (2006.01)
  *E04D 5/14* (2006.01)
  *B29L 31/10* (2006.01)
  *B29C 63/02* (2006.01)

(52) U.S. Cl.
  CPC ...... *B29C 66/4722* (2013.01); *B29C 66/8122* (2013.01); *B29C 66/81469* (2013.01); *B29C 66/8362* (2013.01); *B29C 66/861* (2013.01); *B29L 2031/108* (2013.01); *E04D 5/148* (2013.01)

(58) Field of Classification Search
  USPC ....... 156/60, 71, 94, 98, 196, 199, 212, 324, 156/349, 443, 446, 459, 475, 486, 538, 156/539, 543, 574, 579; 15/230, 230.11; 492/13, 28, 39, 40, 48, 49, 53, 56
  See application file for complete search history.

(56) References Cited

U.S. PATENT DOCUMENTS

| | | | |
|---|---|---|---|
| 3,714,674 A * | 2/1973 | Simoncioni | B05C 17/0215 15/230.11 |
| 3,970,396 A * | 7/1976 | Brady | B05C 17/022 401/208 |
| 4,274,202 A * | 6/1981 | Petrick | B44C 7/027 30/365 |
| 4,439,904 A * | 4/1984 | Hoopengardner | A47G 27/0487 156/304.7 |
| 4,894,112 A | 1/1990 | Lippman | |
| 5,242,362 A * | 9/1993 | Talamantez | B05C 17/02 16/426 |
| 5,966,772 A * | 10/1999 | Woodnorth | B05C 17/00 118/258 |
| 5,983,437 A * | 11/1999 | Wakat | B05C 17/0207 15/230.11 |
| 6,135,934 A * | 10/2000 | Couch | E04D 15/04 15/230.11 |
| 6,238,740 B1 * | 5/2001 | Janssen | B05C 17/0232 118/264 |
| 6,685,609 B2 * | 2/2004 | Carder | A47G 27/0487 492/13 |
| 2004/0002414 A1 | 1/2004 | Barksdale et al. | |
| 2016/0201333 A1 | 7/2016 | Grubbs | |

* cited by examiner

ROLLER FOR APPLYING A SHEET OR MEMBRANE TO A GENERALLY VERTICAL SURFACE

CROSS REFERENCE TO RELATED APPLICATIONS

This application claims the benefit of prior U.S. Provisional Patent Application Ser. No. 62/680,127, filed on Jun. 4, 2018; the disclosure of which is entirely incorporated herein by reference.

TECHNICAL FIELD

The present disclosure relates to an apparatus and method for applying sheets of fluid impermeable membrane to a generally vertical surface. The vertical surface may be on the roof of a building or the vertical surface may be a foundation wall of the building. The apparatus may be a roofer tool that effectuates the attachment of the impermeable membrane to the vertical surface and enables the membrane to be rolled flat.

BACKGROUND

Sheets of roofing membrane are commonly used in many industrial and commercial roofing applications wherein large sheets of a waterproof membrane, are overlapped and then heated and pressed together to form a heat weld. These sheets are usually an elastomeric-type of material such as various rubber compositions, or thermoplastic sheets and the like. When done properly this method forms a strong water impervious seam which prevents subsequent peeling apart of the seam and prevents the penetration of water into the roof of a structure below the membrane. Various types of devices have been developed for initially heating the edges of the overlapped membrane sheets, such as power propelled roller mechanisms which move along the seam and applies pressure to the overlapped sheets with a following roller. These machines work well for long flat horizontal seams (i.e., parallel to the foundation of the building) but cannot function as well along vertical seams (i.e., orthogonal or perpendicular to the foundation of the building).

In another type of apparatus and method, an installer using a hand-held heat gun such as disclosed in U.S. Pat. No. 4,894,112, presses the heated overlapped membrane sheets together by use of a hand roller which is moved along the heated edges. This manual heating of the overlapping membrane edges followed by the subsequent roller pressure applied thereto, is used at various locations on a roof, especially to form the overlapping joints around various protrusions and joints which occur on a roof such as around skylights, ducts, overhanging locations, corners, etc. It has been found that the locations around such protrusions and joints are more time-consuming to do properly and are more difficult to form the water impervious seam than in the flat straight seams. Thus, such seams and joints almost always will be formed with hand-held roller and hand-held heat applying gun.

Some buildings include a vertical wall adjacent a portion of the perimeter edge of the building that extends upwardly above the flat horizontal portion of the roof. This may function as a façade to mount a sign that is visible to persons from below. Additionally, the vertical wall on the roof blocks persons from below from viewing various industrial components, such as satellites, HVAC units and the like, which are typically considered an eyesore.

The interior vertical face of the vertical wall is at least partially covered with the roof membrane. Usually, a length of the roof membrane is longer than the flat portion of the roof such that the end of the membrane runs upwardly from the bottom corner of the roof. The membrane forms a rounded corner that prevents water from accumulated near the outer peripheral edges of the roof.

It is often difficult to apply the membrane to the vertical wall of the roof due to the relatively large surface area of the portion of the membrane that extends up the vertical wall. Further, the vertical seams formed by adjacent overlapped membranes are difficult to seal because the vertical orientation makes it difficult for an installer to apply the required force and leverage to seal the seam.

Impermeable membranes are also used in other areas of the building. For example, the foundation of the building typically includes an impermeable membrane attached or adhered in order prevent fluid from entering the building. This is sometimes referred to as waterproofing. The foundation of the building is also a vertical surface that is difficult to apply membranes to due to the large surface area that needs covered.

Some references teach rolling tools that could be used with impermeable membranes. These exemplary rolling tools are: DE2928300A1; U.S. Pat. No. 6,135,934; US2004/0002414; US2016/0201333; and WO2017/183023. However, these tools would prove difficult for applying the impermeable membranes to a vertical surface due to their construction and configuration.

SUMMARY

Issues continue to exist when applying impermeable membranes to vertical walls or surfaces on a building. Thus, a need continues to exist for a tool or device that eases the application of the fluid impermeable membrane to a vertical wall. The present disclosure addresses these and other issue by providing a roller tool designed to apply membranes or sheets to a generally vertical surface. In some instance, this roller tool may also be used to create as seal a vertical seam formed from two adjacent overlapped membranes.

In accordance with one aspect, an exemplary embodiment of the present disclosure provides a roller tool comprising: a roller head frame; an axle connected to the roller head frame; a plurality of rollers supported by the axle on the roller head frame, wherein each one of the rollers from the plurality of rollers is identically shaped and are arranged end-to-end along the axle extending between ends of the roller head frame; and a pole handle coupled to the roller head frame opposite the plurality of rollers. This exemplary embodiment or another exemplary embodiment may provide an outer layer of each roller formed from a polymer material configured to withstand pressure and heat for adjoining fluid impermeable membranes to a vertical surface. This exemplary embodiment or another exemplary embodiment may provide a hub on each roller supporting each outer layer, wherein each hub includes a neck that supports a bearing to effectuate rotation of each roller about the transverse axis. This exemplary embodiment or another exemplary embodiment may provide a sleeve spacer extending around the axle between adjacent bearings inside adjacent rollers to define a gap between adjacent rollers. This exemplary embodiment or another exemplary embodiment may provide a first roller having a central bore coaxial with the axle; a second roller having a central bore coaxial with the axle; wherein the first roller is directly adjacent to the second roller and the central bores of the first and second roller are equal in diameter.

In another aspect, an exemplary embodiment of the present disclosure may provide a roller tool for applying membrane sheets to a generally vertical surface comprising: a roller head; a plurality of rollers supported by the roller head, wherein each one of the rollers from the plurality of rollers is identically shaped and arranged end-to-end along a fixed axle, which defines a transverse axis, extending transversely between ends of the roller head and supporting the plurality of rollers thereon; an outer layer of each roller formed from a polymer material configured to withstand pressure and heat for adjoining fluid impermeable membranes to the generally vertical surface; a hub on each roller supporting each outer layer, wherein each hub includes a neck that supports a bearing to effectuate rotation of each roller about the transverse axis; and a sleeve spacer extending around the axle between adjacent bearings inside adjacent rollers to define a gap between adjacent rollers. This exemplary embodiment or another exemplary embodiment may provide a pole handle connected to the roller head at a distal end and the handle extending longitudinally to a proximal end that is to be manipulated by a user when applying the membrane sheets to the vertical surface. This exemplary embodiment or another exemplary embodiment may provide a first roller including a right end and an left end; a second roller including a right end and a left end; and a third roller including a right end and a left end; wherein the second roller is intermediate the first roller and the third roller such that the left end of the second roller is adjacent the right end of the first roller, and the right end of the second roller is adjacent the left end of the third roller. This exemplary embodiment or another exemplary embodiment may provide a fourth roller including a right end and a left end; wherein the left end of the fourth roller is adjacent the right end of the third roller. This exemplary embodiment or another exemplary embodiment may provide a fifth roller including a right end and a left end; wherein the left end of the fifth roller is adjacent the right end of the fourth roller. This exemplary embodiment or another exemplary embodiment may provide a transversely aligned width of the roller head measured along the transverse axis that is in a range from about 6 inches to about 24 inches. This exemplary embodiment or another exemplary embodiment may provide wherein the range of the transversely aligned width is from about 8.5 inches to about 18 inches. This exemplary embodiment or another exemplary embodiment may provide wherein each roller from the plurality of rollers is identically shaped and freely rotates about the transverse axis independent from rotational movement of an adjacent roller. This exemplary embodiment or another exemplary embodiment may provide two bearings inside each roller, wherein the two bearings are spaced apart by the hub and secured against the neck. This exemplary embodiment or another exemplary embodiment may provide a central portion of the roller head; a first arm of the roller head extending transversely from the central portion; a second arm of the roller head extending transversely from the central portion in an opposite direction from the first arm; and wherein the axle extends transversely through the first and second arms adjacent terminal ends thereof. This exemplary embodiment or another exemplary embodiment may provide an angled portion on each of the first arm and the second arm that is oriented at an angle between 30 degrees and 60 degrees relative to both the transverse axis and a longitudinal axis.

In yet another aspect, an exemplary embodiment of the present disclosure may provide a method of applying a membrane or sheet to a generally vertical surface with a roller tool comprising: applying a portion of a membrane or sheet to a generally vertical surface; rolling a plurality of rollers vertically, repeatedly up and down, over the portion of the membrane or sheet over the generally vertical surface, wherein, wherein each one of the rollers from the plurality of rollers is identically shaped and are arranged end-to-end along an axle extending between ends of a roller head frame; and effecting the portion of membrane or sheet to be secured to the generally vertical surface. This exemplary embodiment or another exemplary embodiment may provide rotating the plurality of rollers in response to upward vertical movement of the roller head frame carrying the plurality of rollers; manipulating an elongated handle from a position offset from the generally vertical surface; and wherein when manipulating the elongated handle, a proximal end thereof is positioned at a greater vertical height than a distal end of the elongated handle that is coupled to the roller head frame. This exemplary embodiment or another exemplary embodiment may provide rotating the plurality of rollers in response to downward vertical movement of the roller head frame carrying the plurality of rollers; manipulating an elongated handle from a position offset from the generally vertical surface; and wherein when manipulating the elongated handle, a proximal end thereof is positioned at a greater vertical height than a distal end of the elongated handle that is coupled to the roller head frame.

In yet another aspect, an exemplary embodiment of the present disclosure may provide a hand tool that has a plurality of similarly or identically shaped rollers aligned end-to-end along an axle such that the outer surface of each respective roller moves about an axis define by the axle. The hand tool may be a roofing roller tool that enables an impermeable vapor membrane or sheet to be applied to a vertical wall extending upwardly from an outer perimeter of a roof. The tool may be manipulated by an elongated pole handle coupled to a roller head or roller head frame.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
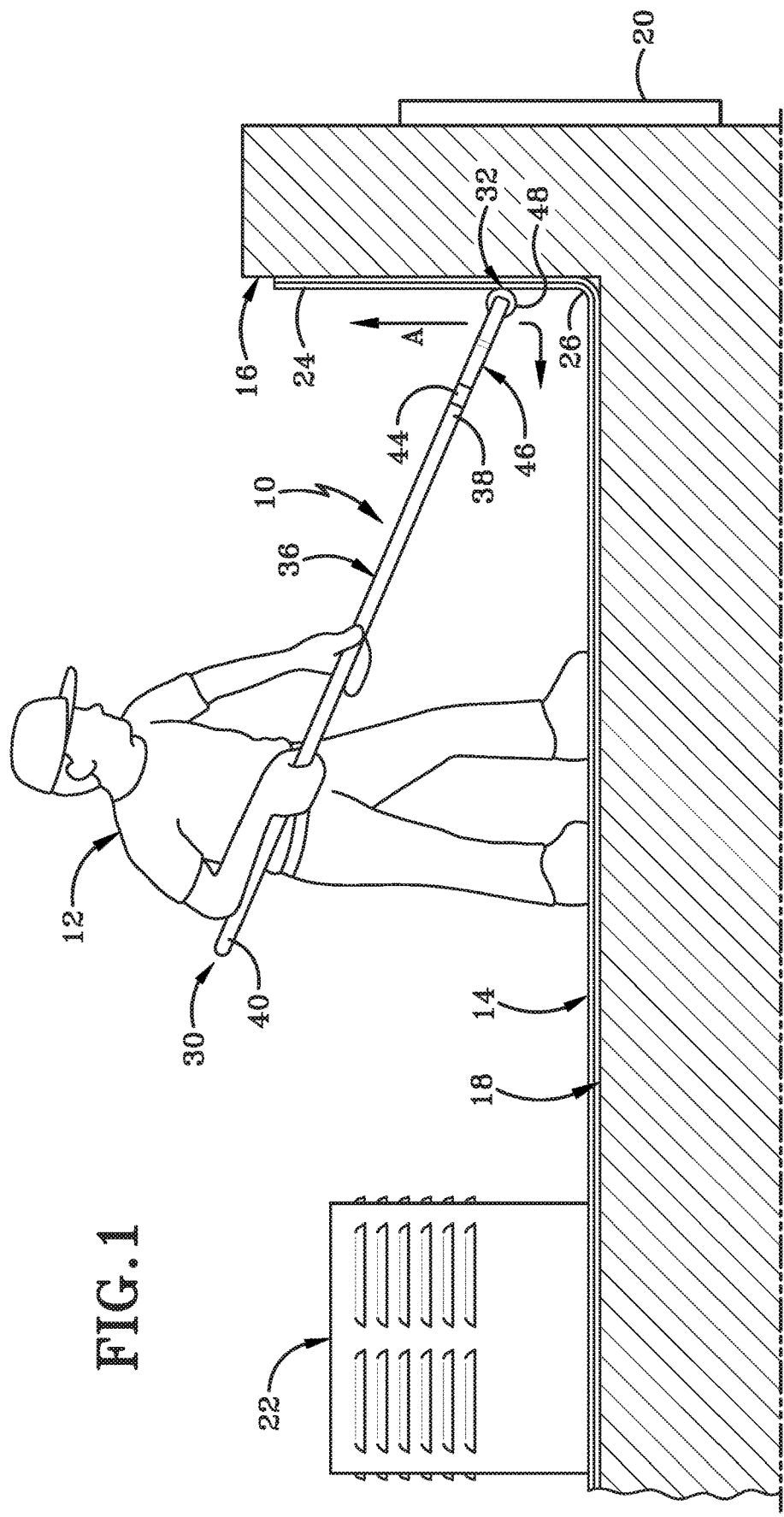
FIG. 1 is a diagrammatic view of a rooftop with a vertical wall around a portion of the perimeter and an installer installing a membrane or sheet with a roller tool in accordance with one embodiment of the present disclosure.

FIG. 1 depicts a tool for a rolling device generally at 10. The rolling device 10 is configured to be maneuvered by hand by an operator 12 to apply an impermeable sheet or membrane 14 to a vertical wall 16 on a building, such as a roof 18, or a foundational wall (not shown). The vertical wall 16 may extend around the perimeter of the building or the roof 18 or at least around a portion of the perimeter and extend upwardly at a height above the roof 18 so as to enable a sign 20 to be hung thereon and displayed outwardly therefrom. The upward extension of the vertical wall 16 enables persons viewing the sign 20 from the street and prevents them from seeing industrial units 22 supported by the roof 18. The industrial unit 22 may be any commercial or residential or industrial mechanical device, such as an HVAC unit or a satellite dish. The membrane 14 is a waterproof material that prevents fluid from penetrating the roof 18 or the foundation walls of a building. The membrane may be a single layer of material, or may be multi-layered. The roof 18 includes a horizontal portion that is substantially parallel to the foundation of the building. The vertical wall 16 extending around at least a portion of the perimeter of the roof 18 is substantially orthogonal to the foundational plane of the building. The membrane 14 extends horizontally along the horizontal portion of the roof 18 and extends upwardly along the vertical wall 16 to define an upper extension 24 of the membrane 14. The upper extension 24 and the horizontal portion of the membrane 14 define a rounded corner 26 that is configured to be impenetrable by fluid. There is no minimum or maximum height associated with wall 16. For example, it is common for some vertical walls 16 on the roof 18 of a building to be greater than ten feet high.

An operator typically applies the membrane 14 to the vertical wall 16 with an adhesive and manually aligns or applies the membrane 14 to the vertical wall. In order to effectuate the adhesion of the upper extension 24 to the vertical wall 16, the operator 12 maneuvers and rolls the tool 10 vertically up and down in the direction or Arrow A to roll the membrane 14, particularly the upper extension 24 of membrane 14, against the vertical wall 16. The adhesive bonds the membrane to the vertical wall 16 and the rolling motion of tool 10 effectuates even displacement of the adhesive so that it may fully cure to secure the membrane to the wall 16 in a fluid-impermeable manner. Furthermore, the tool 10 could be utilized, in some envisioned implementations, to seal a seam of adjoining sheets of membrane 14 together. The tool 10 may be utilized to form the seal along the seam of adjacent strips of sheets of membrane 14 prior to the material being applied to the vertical wall 16. However, it is also likely that the seal is already created when the upper extension 24 of membrane 14 is already applied to the vertical wall 16. Inasmuch as the vertical wall may be of a height that is less than that of the operator, during the manual movement/action of the tool 10, rotating a plurality of rollers in response to upward vertical movement of a roller head frame carrying the plurality of rollers is accomplished by manipulating an elongated handle from a position offset from the generally vertical surface. When manipulating the elongated handle, a proximal end of the handle is positioned at a greater vertical height than a distal end of the elongated handle that is coupled to the roller head frame due to the lowered height of the vertical wall. Similarly, when rotating the plurality of rollers in response to downward vertical movement of the roller head frame carrying the plurality of rollers similarly results in a proximal end of the pole handle being positioned at a greater vertical height than a distal end of the elongated handle that is coupled to the roller head frame.

Figure 2:
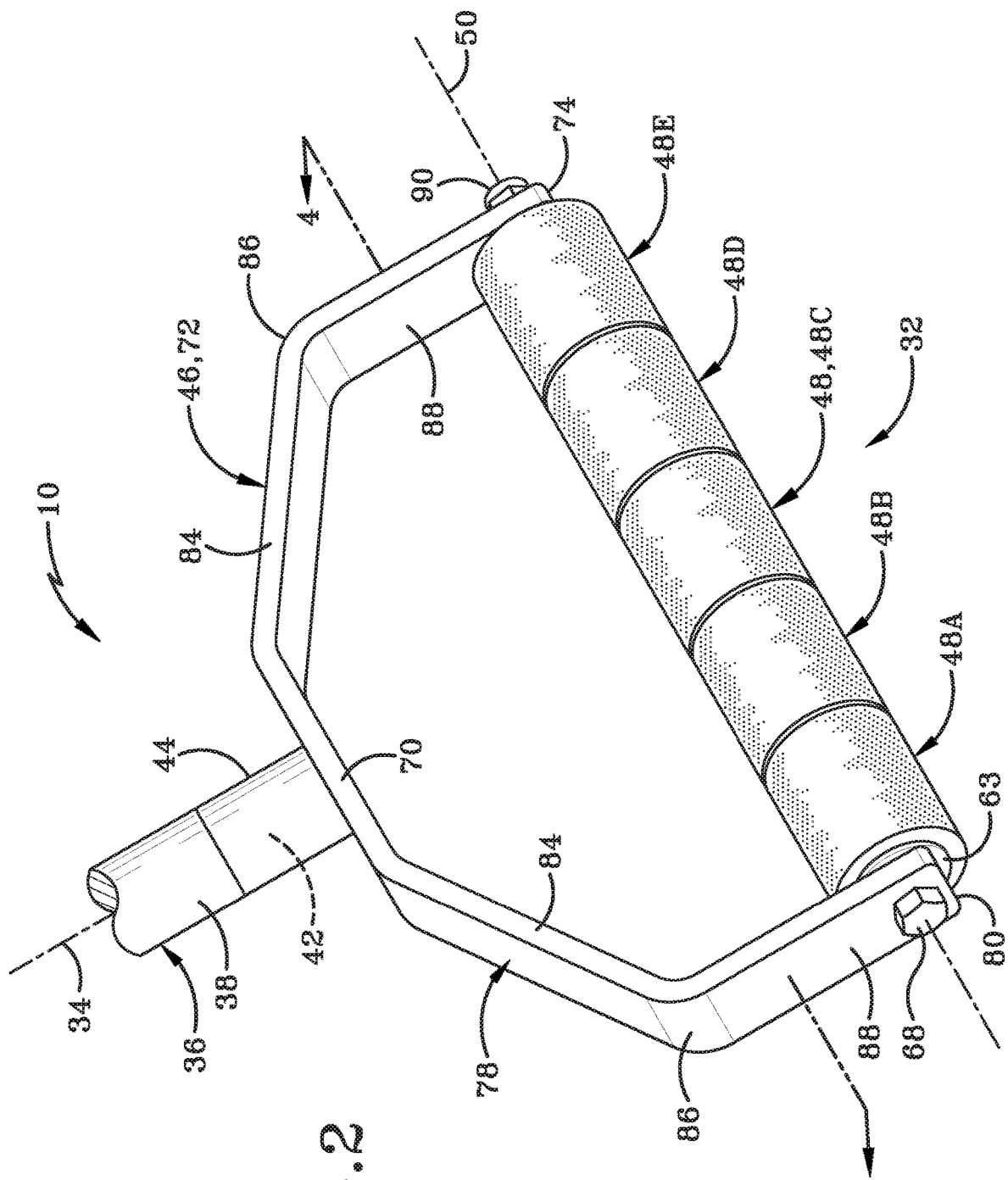
FIG. 2 is a perspective view of a distal end of the roller tool.

FIG. 2 depicts the roller tool 10 including a proximal end 30 (FIG. 1) opposite of distal end 32 defining a longitudinal direction therebetween. An extended and elongated pole or handle 36 extends longitudinally along a longitudinal axis 34 from the proximal end 30 towards the distal end 32. The pole handle 36 may be completely uniform in length or it may be a telescoping member so as to be adjustable in length relative to the longitudinal axis 34. This would be beneficial on a wall 16 that has a height of about ten feet or higher. The distal end 38 of pole handle 36 may be threaded with a threaded male member similar to that of a conventional broom handle or broom pole. Further, the proximal end 40 of the pole handle 36 which defines the proximal end 30 of device 10 may be capped or covered with a grip so as to enable the operator 12 to securely grasp the pole handle 36. The threaded extension 42 defining the distal end 38 of the handle 36 is configured to mate with a complementary threaded female receptacle 44. In one particular embodiment, the threaded receptacle 44 is transversely centered on a roller head 46 and defines the proximal end thereof. In some implementations, the pole handle 36 is lightweight in order to keep the overall weight of the tool 10 less than about five pounds. In some embodiments, when the tool 10 is about five pounds or less, the pole handle 36 is less than about two or three pounds.

Roller head 46 includes a proximal end defined by the threaded receptacle 44 and a distal end defined by a plurality of rollers 48 that are transversely aligned along a transverse axis 50 that is perpendicular and orthogonal to the longitudinal axis 34 of the pole handle 36. Each one of the plurality of rollers 48 is coaxial along the transverse axis 50 and is configured to rotate about the axis 50. Accordingly, an exterior convex surface or cylindrical outer wall of each one of the rollers 48 includes at least one tangential motion vector parallel to the longitudinal axis 34. Each roller from the plurality of rollers 48 can move independently relative to an adjacent roller. In one particular embodiment, each roller from the plurality of rollers is identical to an adjacent roller. Some embodiments may utilize small spacers such that a gap is created between adjacent rollers. However, it is also possible for the rollers to slightly contact each other. In some implementations, the spacer between adjacent rollers from the plurality of rollers 48 can be a sleeve and in other scenarios, the spacer may be formed from a high-density, low friction element which may be formed from materials such as high-density polyethylene (HDPE).

Each one of the rollers from the plurality of rollers 48 may be identically sized and structured relative to each of the other rollers from the plurality of rollers 48. Stated otherwise, each roller includes a uniform outer diameter and a uniform inner diameter and a uniform cylindrical length oriented along the transverse axis 50 and orthogonal to the longitudinal axis 34. Stated otherwise, in one particular embodiment, one of the interior rollers from the plurality of rollers 48 does not have an increased inner diameter defining a larger bore to enable the same roller to "float" over obstacles integral to the wall 16. However, other embodiments of the roller tool of the present disclosure could have this configuration.

Each roller from the plurality of rollers 48 may include a convex cylindrical outer surface 52 opposite a concave cylindrical inner surface 54 defining a transversely aligned bore 56 therethrough. A radial thickness of the outer layer of the roller is established between the inner surface 54 and the outer surface 52. The radial thickness of the roller may be substantially uniform along the transverse length of the roller and along all radial points thereof. In one particular embodiment, the roller material is a substantially dense silicone material. However, other dense polymers may be utilized such that the roller is substantially nonporous and heat-resistant. Each roller may include a cylindrical hub 58 that supports the outer layer of polymer material and is positioned radially inward from the inner surface 54 of the roller exterior layer of material. The hub 58 includes an outer surface and an inner surface and the outer surface of the hub 58 is closely adjacent and preferably in permanent contact with the cylindrical inner surface 54 of the roller. The inner surface of each hub 58 defines a neck 60 that defines a seat receiving a bearing 62 thereon. A cylindrical spacer or sleeve 64 separates a bearing 62 nested against the seat or neck 60 from one roller with an adjacent bearing 62 sitting against the seat or neck 60 of an adjacent roller. The spacer sleeve 64 helps establish the gap 66 between adjacent rollers from the plurality of rollers 48.

An axle 68 defines the transverse axis 50 to enable the rollers from the plurality of rollers 48 to rotate thereabout. In one particular embodiment, each one of the rollers 48 is concentric with the axle 68 and is free to spin thereabout via the bearing 62. In one particular embodiment, there are two bearings located within each roller from the plurality of rollers 48. However, it is envisioned that an alternative number of bearings may be utilized without departing from the scope of the present disclosure. Furthermore, a free spinning connection may be effectuated through the removal of the bearings simply by providing a hub that is slightly larger than the axle so as to enable a free connection and a free spin of each one of the rollers to rotate about the transverse axis 50.

Figure 4:
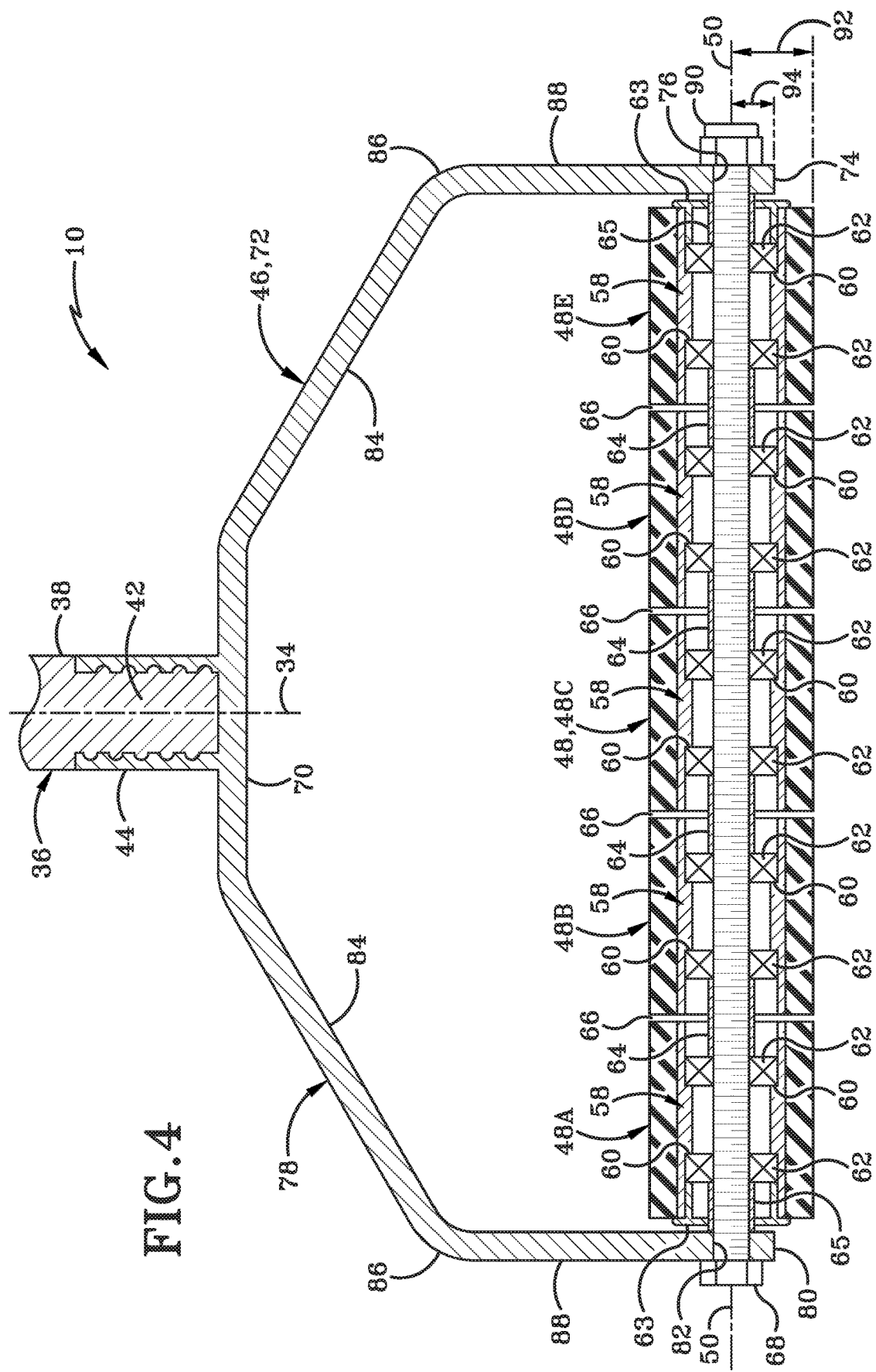
FIG. 4 is a cross-section view taken along line 4-4 in FIG. 2.

FIG. 2 and FIG. 4 depict one particular embodiment in which the roller tool 10 includes five rollers in its plurality of rollers 48. More particularly, the roller tool 10 includes a first roller 48A, a second roller 48B, a third roller 48C, a fourth roller 48D, and a fifth roller 48E. Each one of the rollers 48A-48E are identical in construction as depicted in FIG. 4. The rollers 48A-48E are aligned end-to-end such that the right end of the first roller 48A is closely aligned with the left end of the second roller 48B and defines the small gap 66 therebetween which is effectuated by the spacer sleeve 64. The right end of the second roller 48B is closely aligned with the left end of the third roller 48C to define the slight gap 66 therebetween. The right end of the third roller 48C is closely aligned with the left end of the fourth roller 48D. The right end of the fourth roller 48D is closely aligned with the left end of the fifth roller 48E. The left end of the first roller 48A and the right end of the fifth roller 48E may be capped with a cap 63. The cap 63 surrounds a spacer sleeve 65 that is concentric about the axle 68. Spacer sleeve 65 is shorter than spacer sleeve 64.

Each one of the rollers 48A-48E includes a length that is measured from end to end and oriented along the transverse axis 50 that is in a range from about one inch to about four inches. More particularly, an embodiment may provide where the length of each roller is in a range from about one inch to about three inches. In one particular embodiment, the length of each one of the rollers is about two inches. As stated previously, each one of the rollers 48A-48E is identical in construction such that each one has a uniform outer diameter and a uniform inner diameter and has similar hub construction such that the axle 68 extends through the center of each one of the rollers 48A-48E and none of the rollers is able to centrically move relative to the other rollers mounted on the axle 68. The overall length of the roller head is in a range from about 8.5 inches to about 18 inches. However, other dimensional lengths oriented along the transverse axis are envisioned. Further, other configurations may be effective in applying membrane 14 to wall 16 in which there are two, three, four, six, seven, eight, nine, or ten or more rollers 48 aligned end-to-end along the axle 68.

Figure 3:
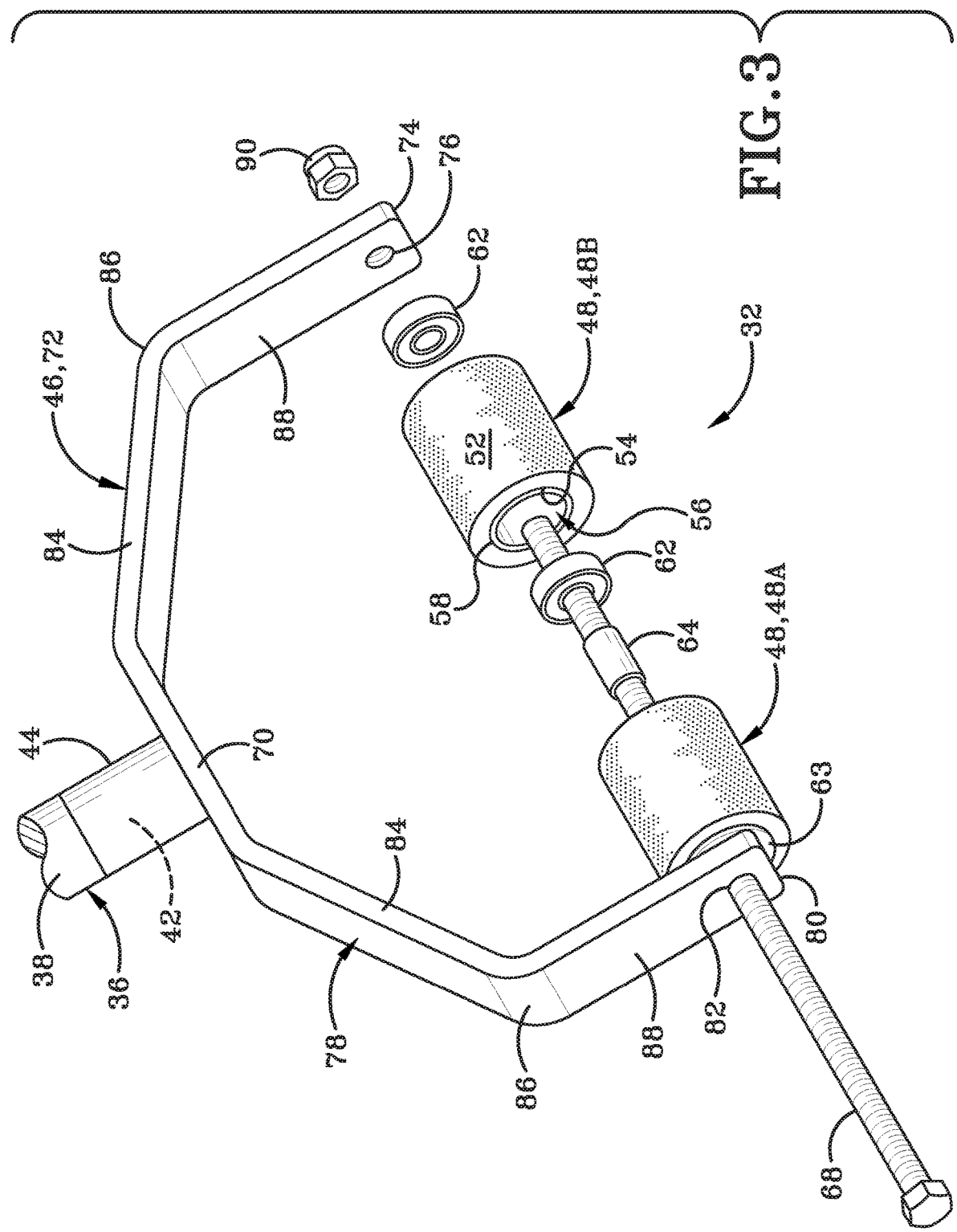
FIG. 3 is an exploded perspective view of some components of the roller tool.

As depicted in FIG. 2, FIG. 3, and FIG. 4, the roller head 46 includes a frame or support having a central portion 70 that is rigidly connected with the threaded receptacle 44. A first arm 72 extends transversely outward to a terminal end 74 that defines a transversely aligned bore 76 therethrough. The roller head 46 further includes a second arm 78 extending transversely outward in an opposite direction of the first arm 72 towards a terminal end 80 which defines a transverse bore 82 therethrough. Each arm 72, 78 may include an angled segment 84 that is oriented at about a 45° angle relative to the longitudinal axis 34 and the transverse axis 50. Other frames may be structured such that the angled segment 84 is at any angle in a range between about 10° and about 80° relative to the longitudinal axis 34 and the transverse axis 50. Further, some embodiments may provide that the angled segment 84 on each arm have the same angle as the segment 84 on the opposing arm of the frame, it is not required. For example, the angled segment on the first arm 72 may be at a greater angle relative to the longitudinal axis 34 than the segment 84 on the second arm 78, or vice-versa. When the angled segments are angled differently, one particular embodiment may provide that one angle is not more than about 30° greater than the other. So for example, the angled segment 84 on the first arm 72 may be at about a 60° angle relative to the longitudinal axis 34 and the angled segment 84 on the second arm 78 may be at a 30° angle relative to the longitudinal axis. Each angled segment 84 may be connected via a rounded corner 86 to a longitudinal segment 88 that is offset parallel to the longitudinal axis 34, orthogonal to the transverse axis 50, and extends distally to each arm's respective terminal end 74, 80. The axle 68 is transversely aligned to extend through the bore 82 in the second arm 78 and the bore 76 in the first arm 72. When the axle 68 extends fully through the first arm 72 and the second arm 78, the roller head 46 establishes a substantially D-shaped configuration, however other letter-shaped configurations are entirely possible. It is envisioned that the substantial portions of the frame of roller head 46 are formed from a uniform material such that a bent piece of metal may effectuate the roller head 46, and namely its frame or structural support elements of the center portion 70 and the first arm 72 and the second arm 78. In some implementations, the unibody frame is a monolithic member that is formed from aluminum or an aluminum alloy. The frame or structural support elements of the center portion 70 and the first arm 72 and the second arm 78 may be generally rectangular in cross section having a cross-sectional width of about ¼ inch. In one particularly embodiment, this sizing or dimensions of the aluminum frame is purposefully chosen to be sufficiently strong while reducing weight of the head. For example, as stated above, tool 10 is generally desirable to maintain at a total weight of about five pounds or less (wherein total weight refers to the summed weight of the pole handle 36 and the roller head 46). Thus, the roller head 46 should weigh about two or three pounds or less.

FIG. 3 depicts an exploded perspective view of some components of the roller head 46. Particularly, it depicts that the axle 68 is formed from a threaded rod that is secured via a nut 90 threaded to the exterior surface of the first arm 72. Other axles may be utilized which effectuate an at least semi-permanent connection of the axle to the frame or support of the roller head 46. However, a non-permanent connection of the axle to the roller head 46 to thereby establish the free rotation of the plurality of rollers that are spaced apart via sleeve 64 and rotate via bearing 62 on hubs 54 is envisioned as well.

As depicted in FIG. 4, the distance 92 between the outer surface 52 and the transverse axis 50 is greater than the distance 94 defined between the terminal ends 74, 80 of the arms on the roller head 46 to the axis 50. This enables the outer surface 52 of the rollers to contact the membrane 14, and more particularly the upward extension 24 of the membrane 14 that is adhered or otherwise secured to the vertical wall 16 on the roof 18 when the operator 12 is moving the tool 10 with vertical strokes as indicated by arrow A in FIG. 1. The height of the rollers 48 or the roller head 46 is sufficient to apply the membrane 14 to the wall 16.

While the roller tool 10 of the present disclosure has been disclosed as including a plurality of rollers 48, it is entirely possible for a tool to be manufactured that includes a roller having a uniform length formed from a single cylindrical roll that would effectuate the upward application of the extension member 24 of the sheet membrane 14 to the vertical wall 16 on the roof 18. One exemplary and non-limiting advantage of utilizing a plurality of rollers 48 is to reduce costs during the construction of the tool 10. Each one of the rollers 48 is relatively inexpensive to manufacture. The use of an elongated single roller may increase costs. However, it might be possible to accomplish similar objectives at a higher price.

Further, as mentioned previously, the tool 10 would be similarly beneficial for the application of membrane 14 to the foundational wall of a building in order to waterproof the same. In waterproofing scenarios, a portion of the foundation wall of the building is exposed via light excavation. Then, an operator may apply the membrane via an adhesive to the foundation wall. Thereafter, tool 10 may be used to roll the membrane 14 against the foundation wall. The rolling of tool 10 against the foundation wall effectuates the adhesion of the membrane 14 to the wall. The adhesive is then permitted to cure to ensure the impermeability.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, any method of performing the present disclosure may occur in a sequence different than those described herein. Accordingly, no sequence of the method should be read as a limitation unless explicitly stated. It is recognizable that performing some of the steps of the method in an different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A roller tool comprising:
   a roller head frame;
   an axle connected to the roller head frame, wherein the axle defines a transverse axis;
   a plurality of rollers supported by the axle on the roller head frame, wherein at least two of the rollers from the plurality of rollers are identically shaped and are aligned end-to-end along the axle extending between ends of the roller head frame;
   a hub on each roller supporting an outer layer on each roller, wherein each hub includes a neck that supports a first bearing and a second bearing to effectuate rotation of each roller about the transverse axis, wherein the first bearing and the second bearing are disposed inside of each roller and are spaced apart by the hub and secured against the neck, and the outer layer of each roller is continuous and uninterrupted between the first bearing and the second bearing of each roller, and wherein the outer layer is radially uniform along its cylindrical length between the first bearing and the second bearing of each roller relative to the transverse axis; and
   a pole handle coupled to the roller head frame opposite the plurality of rollers.

2. The roller tool of claim 1, wherein the outer layer of each roller is
   formed from a polymer material configured to withstand pressure and heat for adjoining fluid impermeable membranes to a vertical surface.

3. The roller tool of claim 1, further comprising:
   a sleeve spacer extending around the axle between adjacent bearings inside adjacent rollers to define a gap between adjacent rollers.

4. The roller tool of claim 1, further comprising:
   a first roller having a central bore coaxial with the axle;
   a second roller having a central bore coaxial with the axle;
   wherein the first roller is directly adjacent to the second roller and the central bores of the first and second roller are equal in diameter.

5. A roller tool for applying membrane sheets to a generally vertical surface comprising:
   a roller head;
   a plurality of rollers supported by the roller head, wherein each one of the rollers from the plurality of rollers is identically shaped and arranged end-to-end along a fixed axle, which defines a transverse axis, extending transversely between ends of the roller head and supporting the plurality of rollers thereon;
   an outer layer of each roller formed from a polymer material configured to withstand pressure and heat for adjoining fluid impermeable membranes to the generally vertical surface;
   a hub on each roller supporting each outer layer, wherein each hub includes a neck that supports a first bearing and a second bearing to effectuate rotation of each roller about the transverse axis, and wherein the first bearing and the second bearing are disposed inside of each roller and are spaced apart by the hub and secured against the neck; and
   a sleeve spacer extending around the axle between adjacent bearings inside adjacent rollers to define a gap between adjacent rollers;
   wherein the outer layer of each roller is continuous and uninterrupted between the first bearing and the second bearing of each roller, and wherein the outer layer is radially uniform along its cylindrical length between the first bearing and the second bearing of each roller relative to the transverse axis.

6. The roller tool of claim 5, further comprising:
   a pole handle connected to the roller head at a distal end and the pole handle extending longitudinally to a proximal end that is to be manipulated by a user when applying the membrane sheets to the vertical surface.

7. The roller tool of claim 5, further comprising:
a first roller including a right end and a left end;
a second roller including a right end and a left end; and
a third roller including a right end and a left end;
wherein the second roller is intermediate the first roller and the third roller such that the left end of the second roller is adjacent the right end of the first roller, and the right end of the second roller is adjacent the left end of the third roller.

8. The roller tool of claim 7, further comprising:
a fourth roller including a right end and a left end; wherein the left end of the fourth roller is adjacent the right end of the third roller.

9. The roller tool of claim 8, further comprising:
a fifth roller including a right end and a left end; wherein the left end of the fifth roller is adjacent the right end of the fourth roller.

10. The roller tool of claim 5, further comprising:
a transversely aligned width of the roller head measured along the transverse axis that is in a range from about 6 inches to about 24 inches.

11. The roller tool of claim 10, wherein the range of the transversely aligned width is from about 8.5 inches to about 18 inches.

12. The roller tool of claim 5, wherein each roller from the plurality of rollers is identically shaped and freely rotates about the transverse axis independent from rotational movement of an adjacent roller.

13. The roller tool of claim 5, further comprising:
a central portion of the roller head;
a first arm of the roller head extending transversely from the central portion;
a second arm of the roller head extending transversely from the central portion in an opposite direction from the first arm; and
wherein the axle extends transversely through the first and second arms adjacent terminal ends thereof.

14. The roller tool of claim 13, further comprising:
an angled portion on each of the first arm and the second arm that is oriented at an angle between 30 degrees and 60 degrees relative to both the transverse axis and a longitudinal axis.

\* \* \* \* \*